(12) United States Patent
Sykes et al.

(10) Patent No.: US 7,856,964 B2
(45) Date of Patent: Dec. 28, 2010

(54) METHOD OF CONTROLLING A PIEZOELECTRIC ACTUATOR

(75) Inventors: Martin Sykes, Rainham (GB); Joseph Walsh, Kineton (GB); Daniel Hopley, Chislehurst (GB); Peter Griffin, Maidstone (GB)

(73) Assignee: Delphi Technologies Holding S.arl, Troy, MI (US)

( * ) Notice: Subject to any disclaimer, the term of this patent is extended or adjusted under 35 U.S.C. 154(b) by 683 days.

(21) Appl. No.: 11/804,923

(22) Filed: May 21, 2007

(65) Prior Publication Data

US 2007/0290573 A1 Dec. 20, 2007

(30) Foreign Application Priority Data

May 23, 2006 (GB) .................. 0610225.5

(51) Int. Cl.
*F02M 51/00* (2006.01)
(52) U.S. Cl. .................. 123/490; 310/316.03; 310/317
(58) Field of Classification Search .................. 123/490; 313/316.03, 317
See application file for complete search history.

(56) References Cited

U.S. PATENT DOCUMENTS

| 6,236,190 | B1 * | 5/2001 | Hoffmann et al. | 320/166 |
| 6,472,796 | B1 * | 10/2002 | Hoffmann et al. | 310/316.03 |
| 6,563,252 | B2 * | 5/2003 | Schrod | 310/316.03 |
| 6,619,268 | B2 * | 9/2003 | Rueger et al. | 123/490 |
| 7,034,437 | B2 * | 4/2006 | Fukagawa et al. | 310/316.03 |
| 2001/0027780 | A1 * | 10/2001 | Rueger et al. | 123/498 |
| 2002/0023622 | A1 * | 2/2002 | Rueger et al. | 123/490 |
| 2004/0169436 | A1 | 9/2004 | Fukagawa | |

FOREIGN PATENT DOCUMENTS

| DE | 10114421 | 10/2002 |
| EP | 1138915 | 10/2001 |
| EP | 1179129 | 8/2003 |
| JP | 2002-544424 | 12/2002 |
| WO | 2005/061876 | 7/2005 |

OTHER PUBLICATIONS

Japanese Office Action.

* cited by examiner

*Primary Examiner*—Erick Solis
(74) *Attorney, Agent, or Firm*—Thomas N. Twomey

(57) ABSTRACT

A method for controlling the displacement of a stack of a piezoelectric actuator for use in a fuel injector comprises determining a desired amount of charge ($\Delta Q$) to be added or removed from the stack. The method further comprises determining an operating parameter of the fuel system and selecting a drive current level (PO, SO) and a drive time ($t_{open}$, $t_{close}$) in accordance with the desired amount of charge ($\Delta Q$) and the operating parameter, and driving the drive current through the stack for the drive time ($t_{open}$, $t_{close}$) in order to add or remove the desired amount of charge ($\Delta Q$).

10 Claims, 9 Drawing Sheets

METHOD OF CONTROLLING A PIEZOELECTRIC ACTUATOR

TECHNICAL FIELD

This invention relates to a method for controlling operation of an actuator for a fuel injector which is used in the delivery of fuel to a combustion space of an internal combustion engine. In particular, the invention relates to improving the control of a piezoelectrically actuated fuel injector over its lifetime, and over a number of different operating conditions.

BACKGROUND TO THE INVENTION

In known piezoelectrically actuated fuel injectors, a piezoelectric actuator arrangement is operable to control movement, directly or indirectly, of a valve needle of the injector between injecting and non-injecting states. The valve needle is engageable with a valve needle seating to control fuel delivery through one or more outlet openings of the injector. The piezoelectric actuator arrangement typically comprises a stack of piezoelectric elements, which have an associated capacitance. In a known control technique, varying a voltage applied across the piezoelectric stack controls the energisation level of the stack and therefore the axial length of the stack.

The application of a first voltage across the stack causes the stack to be energised to a first high energisation level in which its length is relatively long. The application of a second voltage across the stack causes the stack to be energised to a second, lower energisation level, and the length of the stack is decreased (i.e. the stack is displaced). By varying the energisation level of the piezoelectric stack, so as to alter stack displacement, movement of the injector valve needle between injecting and non-injecting states can be controlled. The voltages applied to the stack are selected to provide displacement of the stack through an amount that gives the required extent of movement (displacement) of the injector valve needle between its injecting and non-injecting states.

Ideally, every time the voltage across the stack is changed from the first voltage to the second voltage the stack is displaced by the same amount and, similarly, every time the voltage is changed back from the second voltage to the first voltage the stack is displaced back to its original position. In other words, a constant voltage change (from the first voltage to the second voltage) will ideally result in a constant stack displacement (from a first length to a second length). However, in practice this is not the case because many factors affect the stroke per voltage, i.e. the length of stack displacement per unit change in voltage.

As the stack ages, the overall capacitance of the stack reduces resulting in the stack being charged to a lesser energisation level for a given voltage change and hence a reduction in stack displacement. This causes inconsistent fuelling over the lifetime of the fuel injector.

Typically, 90% of the change or drift in the performance of the injector occurs within the first few hours of use. Therefore, it is normal to run the injectors for a number of hours during testing (referred to as the 'run-in period'), past the majority of the total change. This is not practical during manufacturing. Furthermore, whilst this compensates for the initial drift problem, the performance of the injector continues to drift over the rest of its lifetime due to the stack ageing and so a problem still remains.

To overcome the ageing problem it is known to 'over-drive' the stack so that initial displacement of the actuator is greater than the maximum required displacement, but so that this maximum required displacement can still be achieved following several hours of actuator use. It is a disadvantage of this solution, however, that the actuator can be damaged by over-driving so that the service life of the actuator, and hence of the injector, is compromised. It is a further disadvantage that fuel delivery increases when over-driving the stack causing inconsistencies in fuel delivery over time. Furthermore, there is a limit to the maximum voltage that can be applied to the actuator before dielectric breakdown occurs, and also due to limitations in the drive circuits or the acceptable tensile stress in inactive parts of the stack or its external electrodes. This places a limit on the maximum displacement that can be achieved with a new actuator.

In addition, piezoelectric material is temperature sensitive and this has an effect on the overall capacitance, and therefore the stroke per voltage characteristics, of the stack as its temperature varies. This temperature versus stroke/voltage relationship is non-linear and as such it is difficult to counteract this variance.

Furthermore, there can be a significant part-to-part variation in the overall capacitance between different injectors. As a result, it is known to calibrate each part, but this is time and cost intensive.

It is an object of the present invention to alleviate or overcome the problems associated with the changes in the displacement characteristic of a piezoelectric actuator as discussed above, whilst alleviating or avoiding the shortcomings of known techniques used to address this.

SUMMARY OF THE INVENTION

According to a first aspect of the present invention, there is provided a method for controlling the displacement of a stack of a piezoelectric actuator for use in a fuel injector of a fuel system, the method comprising determining an operating parameter of the fuel system, determining a desired amount of charge to be added or removed from the stack, selecting a drive current level and a drive time in accordance with the desired amount of charge and the operating parameter, and driving the drive current through the stack for the drive time in order to add or remove the desired amount of charge.

It is an advantage of the present invention that control of the actuator over its lifetime is improved. Advantageously, the method of the present invention is not susceptible to capacitance changes in the life of the stack as in the prior art systems described above. It is a further advantage that the method of the present invention improves control over the accuracy of stack displacement in spite of variations in operating conditions, such as part-to-part variations, since stroke/charge variations between parts are generally smaller than stroke/voltage variations between parts. A further advantage is that there is a linear variation in stack displacement with temperature for a constant change in charge. In known prior art control methods the variation in stack displacement with temperature for a constant change in voltage is non-linear. The linear displacement associated with the method of the present invention can be accounted for easily, unlike the non-linear variation associated with known prior art methods.

It is desirable for the operating parameter is one that affects the performance of the piezoelectric stack, for example stack temperature. Also, particularly in the context of operation within a common rail fuel system, the operating parameter may be the pressure of fuel contained within a common rail fuel volume of the fuel system.

In one embodiment, the method includes removing charge from the stack during a primary opening phase/time at a rate determined by a primary opening current level, and adding charge to the stack during a primary closing phase/time at a rate determined by a primary closing current level.

In another embodiment, the method includes adding charge to the stack during a primary opening phase/time at a rate determined by a primary opening current level, and removing charge from the stack during a primary closing phase/time at a rate determined by a primary closing current level.

Preferably, the method includes determining the primary opening current level, the primary closing current level, and the primary opening time from look-up tables or data maps. The method may also include determining the primary closing time on the basis of the amount of charge removed during the primary opening phase, and the primary closing current level.

In a preferred embodiment the method also comprises one or more additional damping phases before and/or after the primary opening phase/time, and/or one or more additional damping phases before and/or after the primary closing phase/time.

One or more damping phases offers the benefit of reducing the stress experienced by the actuator when trying to achieve desired lift.

Preferably, the method further comprises determining a current level and duration for each additional damping phase, and assigning a priority value to each additional damping phase.

Typically, the method includes determining the damping phase current levels and durations from one or more look-up tables and/or data maps.

Preferably, the method further comprises determining an available injector on time depending on at least one operating variable of the fuel system and a hardware switching time, comparing the sum of (i) the primary opening time and (ii) the duration of each of the additional damping phases with the available injector on time, and if the available injector on time is not greater than the sum of (i) and (ii), reducing the duration of one or more of the damping phases, starting with the additional damping phase with the lowest priority value.

In a preferred embodiment, the method includes adjusting the damping phase current level in accordance with an adjustment factor as the remaining damping time tends to zero in order to successively increase the damping phase current level towards the primary opening current level.

Typically, the adjustment factor is dependent on at least one of (i) the difference between the primary opening current level and the damping phase current level, and (ii) a function of the remaining damping time and a desired damping time.

Preferably, the method further comprises activating an injector select switch to enable the injector to open during an opening phase comprising the primary opening phase and at least one additional damping phase, discharging the stack so as to open the injector wherein, at the transition between the primary opening phase and a first additional damping phase and/or between adjacent additional damping phases, the injector select switch is temporarily deactivated in order to ensure consistent fuel delivery.

Alternatively, the method further comprises activating an injector select switch to enable the injector to open during an opening phase comprising the primary opening phase and at least one of the additional damping phases, charging the stack so as to open the injector, wherein at the transition between the primary opening phase and a first additional damping phase and/or between adjacent additional damping phases the injector select switch is temporarily deactivated in order to ensure consistent fuel delivery.

Preferably, the method further comprises activating an injector select switch to enable the injector to close during a closing phase comprising the primary closing phase and at least one of the additional damping phases, charging the stack so as to close the injector, wherein at the transition between the primary closing phase and a first additional damping phase and/or between adjacent additional damping phases the injector select switch is temporarily deactivated in order to ensure consistent fuel delivery.

Alternatively, the method further comprises activating an injector select switch to enable the injector to close during a closing phase comprising the primary closing phase and at least one of the additional damping phases, discharging the stack so as to close the injector, wherein at the transition between the primary closing phase and a first additional damping phase and/or between adjacent additional damping phases the injector select switch is temporarily deactivated in order to ensure consistent fuel delivery.

From another aspect, the invention provides a method for controlling the displacement of a stack of a piezoelectric actuator for use in a fuel injector in a fuel system, the method comprising determining an operating parameter of the fuel system, determining a desired amount of charge to be transferred from/to the stack, selecting a drive current level and a drive time in accordance with the desired amount of charge and the operating parameter, and driving the drive current through the stack for the drive time in order to transfer the desired amount of charge to/from the stack during a primary drive phase at a rate determined by a primary drive phase current level, transferring charge to/from the stack during one or more damping phases before and/or after the primary drive phase at a rate determined by a damping phase current level. The method further includes activating an injector select switch to enable the injector to open/close during the primary drive phase and the at least one damping phase, and transferring charge to/from the stack to operate the injector, wherein at the transition between the primary drive phase and a first damping phase and/or between adjacent damping phases, the injector select switch is temporarily deactivated in order to ensure consistent fuel delivery.

According to a further aspect of the present invention there is provided a controller for a stack of a piezoelectric actuator for use in a fuel injector; the controller comprising a charge calculation module for determining a desired amount of charge to be added or removed from the stack, a drive current selection module for selecting a drive current level and a drive time in accordance with the desired amount of charge and an operating parameter, and an electrical drive arrangement for driving the drive current through the stack for the drive time in order to add or remove the desired amount of charge.

The invention also resides in a computer program product comprising at least one computer program software portion which, when executed in an executed environment, is operable to implement the method(s) described above, and a date storage medium having said computer software portion stored thereon.

Further, the invention resides in a microcomputer provided with said data storage medium.

It will be appreciated that all of the steps of the method of the first aspect of the invention may be implemented within the method of the second aspect and the controller of the third aspect of the invention, as appropriate.

Preferred embodiments of the invention will now be described, by way of example only, with reference to the accompanying drawings in which:

DETAILED DESCRIPTION OF PREFERRED EMBODIMENTS

Figure 1:
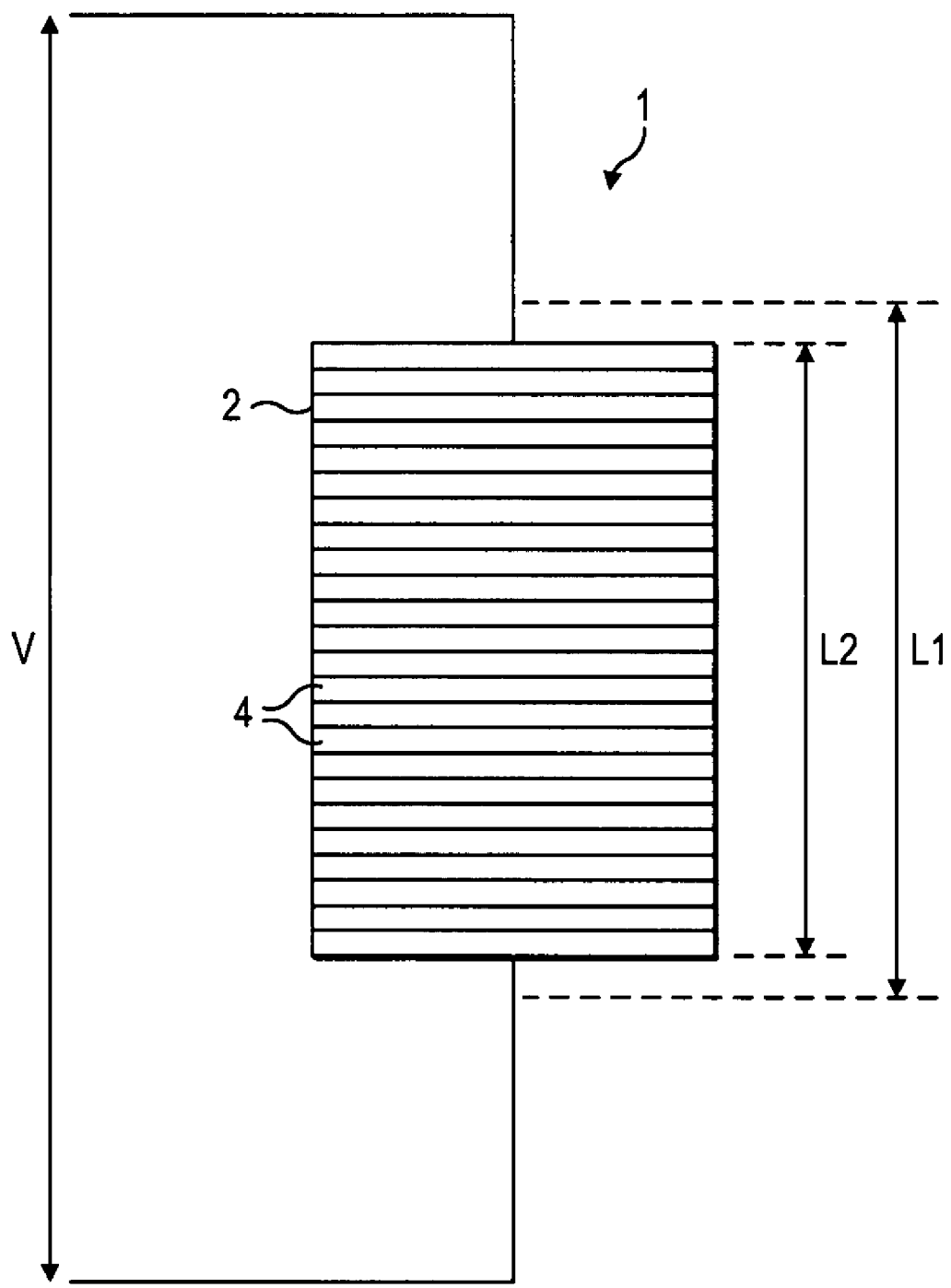
FIG. 1 is a schematic diagram of a piezoelectric actuator including a stack of piezoelectric elements.

FIG. 1 shows a schematic diagram of a piezoelectric actuator 1 including a stack 2 of capacitive piezoelectric elements 4, which are effectively connected in parallel. The stack 2 is charged to different energisation levels by driving a current I into or out of the stack 2 for a given time t, in accordance with the relationship below:

Charge ($Q$)=Current ($I$)×time ($t$).

FIG. 2(a) shows a typical graph of charge versus time for an actuator 1, which is driven from a closed non-injecting position to an open injecting position (i.e. an opening/discharging phase 6) and back again to the non-injecting position (i.e. a closing/charging phase 8). During the opening phase 6 the charge changes from a first charge level Q1 to a second charge level Q2 over a time $t_{open}$. The difference between Q1 and Q2 equals a change in charge ΔQ, which corresponds to the length of the stack 2 changing from a relatively long length L1 to a relatively short length L2, as shown in FIG. 1. The change in length of the stack 2 directly controls movement of an injector valve needle, and hence controls fuel delivery. For example an injector suitable for use with the present invention is described in EP 1174615.

The aforementioned method of controlling of piezoelectric actuators 1 is referred to as a charge control method. It is possible to operate an injector using this method by determining how much charge is to be applied/removed, and driving an appropriate constant current through the stack 2 for the required time in accordance with the equation above. In practice a varying current is used. The mean value of the current is known, and will be referred to as the current set point or level. FIG. 2(b) also shows a typical graph of current versus time, for a varying current (the mean value/set point is shown by the dashed line), which is driven through the stack 2 in order to achieve the charge waveform shown in FIG. 2(a).

A reason for varying the current in this manner is to enable a portion of energy stored in the inductor and the injector selected for injection to be transferred back to the storage capacitors during a 'recirculation phase', which is described in detail below.

Figure 3:
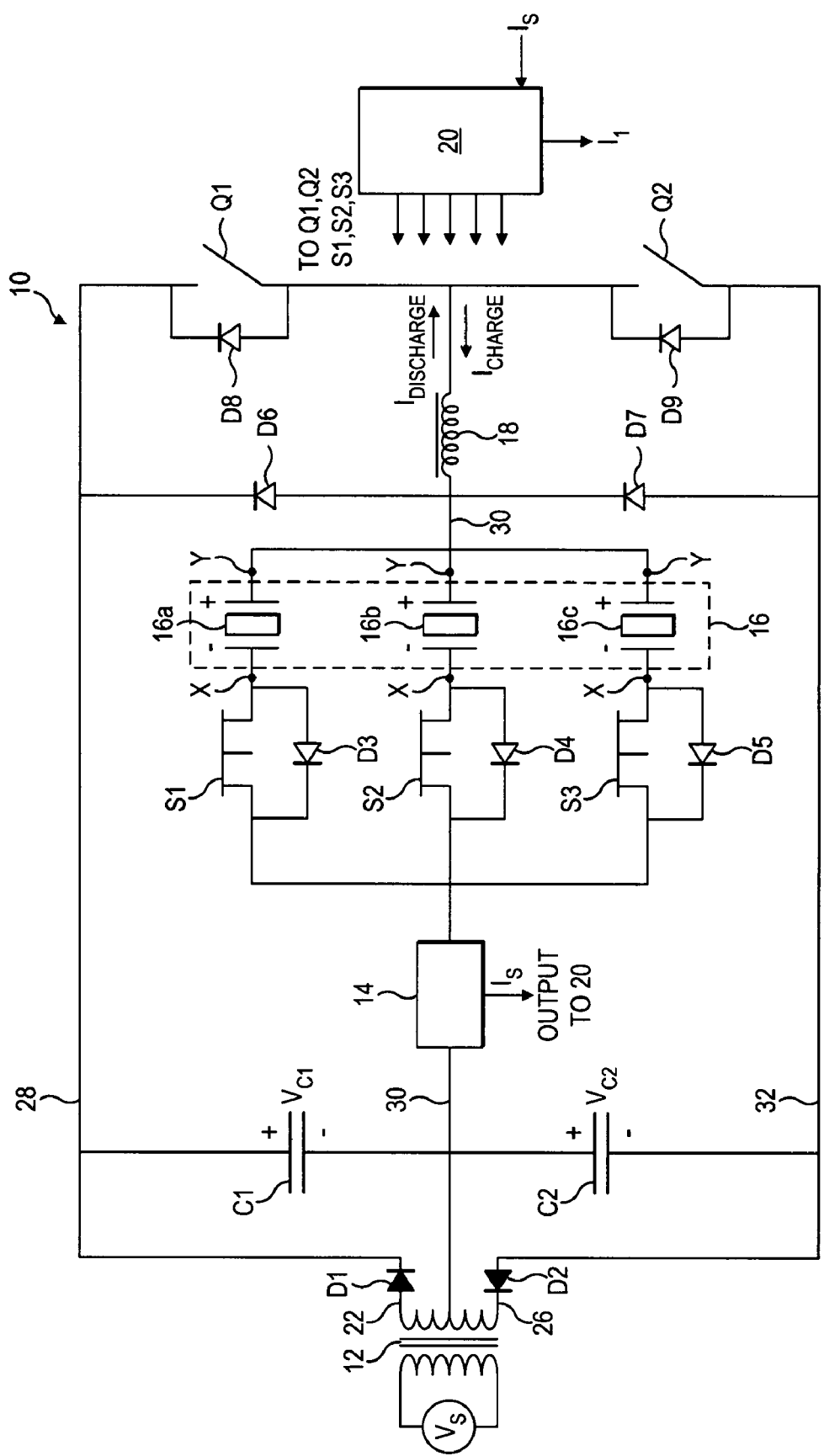
FIG. 3 is a circuit diagram of a drive circuit of the present invention.

The circuit diagram in FIG. 3 is of an electrical drive arrangement, or 'drive circuit' 10 comprising a voltage source Vs, a step-up transformer 12, first and second energy storage capacitors C1 and C2, a current flow sensing and control means 14, a bank of injectors 16 with associated injector select switches S1 S2 S3, an inductor 18, a charge switch Q1, a discharge switch Q2, and a microprocessor 20.

The voltage supply $V_S$ is connected to a primary winding of the step-up transformer 12, the secondary winding of which has three output connections, 22, 24, 26. The first output connection 22 connects through a first diode D1 to a top voltage rail 28; the second output connection 24 connects to a bi-directional middle current path 30; and the third output connection 26 connects to a bottom voltage rail 32 through a second diode D2.

The first energy storage capacitor C1 is connected between the top voltage rail 28 and the middle current path 30, and the second storage capacitor C2 is connected between the middle current path 30 and bottom voltage rail 32.

The voltage $V_S$ is increased to a higher step-up voltage, $V_{C1}$, via the step-up transformer 12. The step-up voltage, $V_{C1}$, is typically in the order of 200-300V and is applied to the first energy storage capacitor C1 via the first diode D1. The step-up transformer 12 also applies voltage $V_{C2}$, typically in the order of 100V, to the second energy storage capacitor C2 via the second diode D2.

It is to be appreciated that other power supply circuits may be suitable for use with this invention.

The middle current path 30 runs through the current flow sensing and control means 14, which is situated between the second output connection 24 of the transformer 12 and the bank of injectors 16.

The bank of injectors 16 comprises a plurality of injectors 16a, 16b, 16c connected in parallel. Each injector 16a, 16b, 16c is connected to a different parallel branch, and each branch includes an injector select switch S1, S2, S3, which has a diode D3, D4, D5 connected across it. The injectors 16a, 16b, 16c are mounted remotely from the drive circuit 10, and connections x and y are provided, to the drive circuit 10, through appropriate connecting leads.

Each of the injector select switches S1, S2, S3 typically takes the form of an insulated gate bipolar transistor (IGBT) having a gate coupled to a gate drive which is powered at a bias supply input.

The negative terminals of each of the injectors 16a, 16b, 16c are connected to their respective select switches S1, S2, S3. The positive terminals of the injectors 16a, 16b, 16c are connected together, and coupled in series to the inductor 18.

A diode D6 is provided between the middle current path 30 on the injector side of the inductor 18 and the top voltage rail 28, and another diode D7 is provided between the bottom voltage rail 32 and the middle current path 30, again, on the injector side of the inductor 18. The diode D6 provides a 'voltage clamping effect' for a selected injector 16a, 16b, 16c at the end of its charge phase 8, and prevents the injector 16a, 16b, 16c from being driven to voltages higher than $V_{c1}$. The diode D7 provides a recirculation path for current flow during the discharge phase 6 of operation, as described in further detail below.

The charge switch Q1 is connected between the non-injector side of the inductor 18 and the top voltage rail 28, and a diode D8 is connected in parallel across it. Likewise, the discharge switch Q2 is connected between the bottom voltage rail 32 and the non-injector side of the inductor 18, and similarly, a diode D9 is connected in parallel across it.

The charge and discharge switches Q1, Q2 may take the form of an n-channel IGBT having a gate controlling current flow from the collector to the emitter.

The output $I_S$ of the current flow sensing and control means 14 is fed into an input of the microprocessor 20, which provides control signals for the current flow sensing and control means, the injector select switches S1, S2, S3, the charge switch Q1, and the discharge switch Q2. The control signals for the discharge and charge switches Q2, Q1 are referred to as a discharge enable signal 34 and a charge enable signal 36, respectively.

The drive circuit of FIG. 3 is one way in which a plurality of injectors 16a, 16b, 16c can be controlled using the charge control method. By controlling the injector select switches S1, S2, S3, the charge switch Q1, and the discharge switch Q2, it is possible to drive a varying current through the stack 2, for the required time, such that the stack 2 is charged/discharged, and fuel delivery is controlled accordingly.

Figure 2:
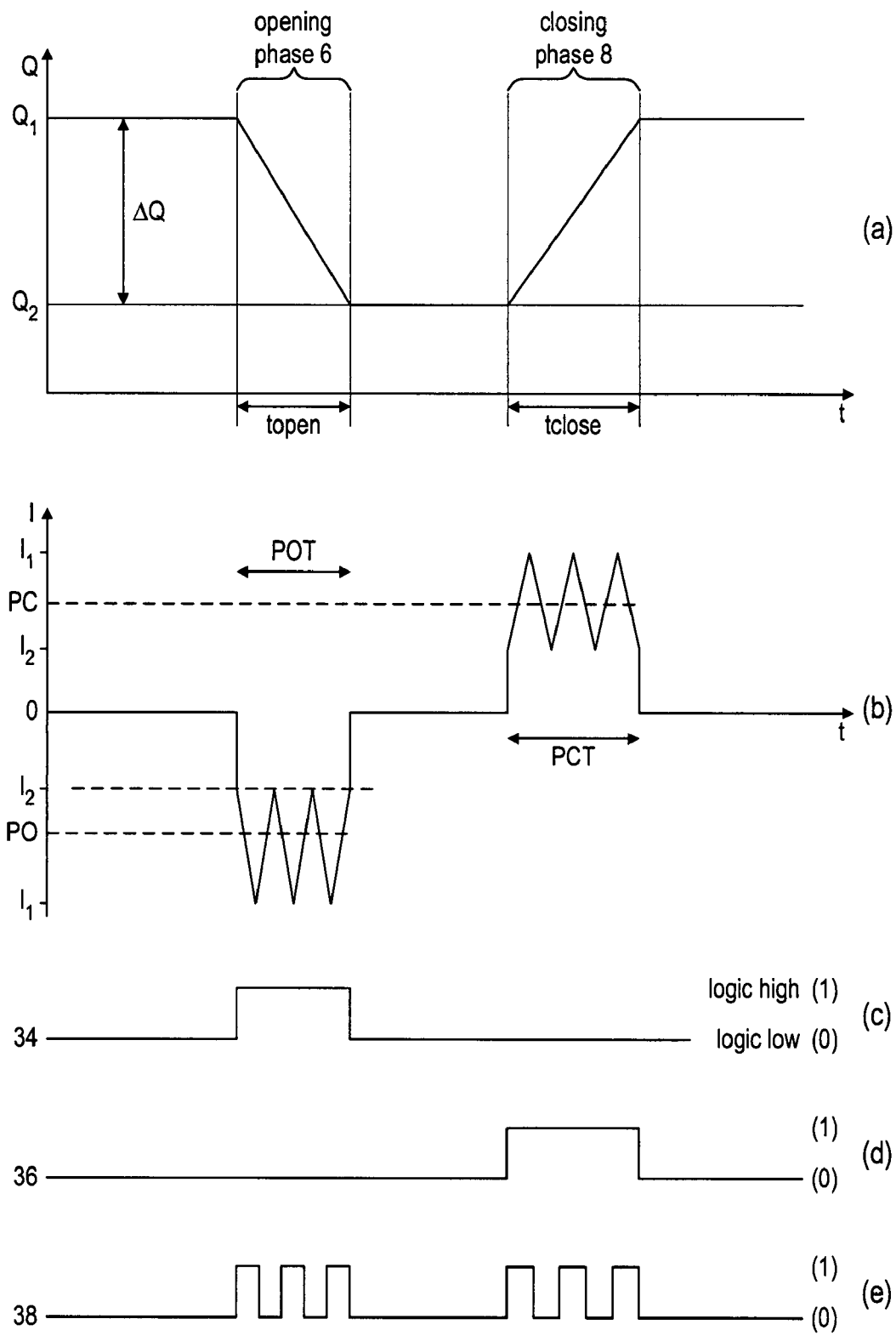
FIG. 2 shows ideal graphs of (a) charge versus time, (b) current versus time, (c) a discharge enable signal, (d) a charge enable signal, and (e) a chopped current control signal, for opening and closing phases of a piezoelectrically actuated fuel injector.

FIG. 2 shows the primary opening current set point PO, primary opening time POT, primary closing current set point PC, and primary closing time PCT.

The current is caused to vary between an upper threshold level $I_1$ and a lower threshold level $I_2$ by the current sensing and control means 14 in conjunction with the microprocessor 20. The current sensing and control means 14 monitors the current flow and generates a chopped signal 38 on the basis of the 'sensed' current $I_S$. This will be described in further detail below. The chopped signal 38 is combined with the discharge enable signal 34 through a logical AND gate, and the resultant signal is applied to the discharge switch Q2. The chopped signal 38 is also combined with the charge enable signal 36 through a logical AND gate, and that resultant signal is applied to the charge switch Q1. The discharge switch Q2 opens and closes to effectively generate the varying current signal in the discharge phase 6. In the charge phase 8, it is the charge switch Q1 that controls generation of the varying current. The discharge enable signal 34, charge enable signal 36, and the chopped signal 38 output from the current sensing and control means 14 are shown in FIG. 2(*c*), (*d*) and (*e*), respectively.

Look-up tables within the microprocessor's memory produce values for a primary opening current set point PO, a primary opening time POT, and a primary closing current set point PC. The values are selected depending on stack pressure, stack temperature, and a demanded injector on time TON (which is determined from the fuel demand and is also a function of the fuel rail pressure). The drive circuit 10, and hence fuel delivery, are controlled by an engine control module (ECM). The ECM incorporates strategies, which determine the required fuelling and timing of injection pulses based on the current engine operating conditions, including torque, engine speed and operating temperature. The timing of when the injectors open and close is determined by the ECM and is not important to the understanding of the present invention.

A primary closing time PCT is determined such that the amount of charge removed during the opening/discharge phase 6 is re-applied during the closing/charge phase 8, depending on the primary closing current set point PC derived from the look-up tables above.

During the discharge phase 6, the value for primary opening current set point PO is converted by the microprocessor 20 into a corresponding upper threshold level $I_1$. While it is possible for the microprocessor 20 to generate both the upper and lower threshold levels $I_1$, $I_2$, in practice it is simpler to generate just the upper threshold level $I_1$, and use a potential divider to generate the lower threshold level $I_2$ as a fixed proportion of the upper level $I_1$. Similarly during the charge phase 8, the microprocessor 20 generates an upper threshold level $I_1$ corresponding to the primary closing current set point PC. The microprocessor 20 outputs one upper threshold level $I_1$ at a time.

The required upper threshold level $I_1$ is output from the microprocessor 20 to the current sensing and control means 14 at the appropriate time depending on the injection timing according to the ECM, the primary opening time POT, and the primary closing time PCT. In other words, for the duration of the primary opening time POT, the upper threshold level $I_1$ corresponding to the primary opening current set point PO is output from the microprocessor 20, and the upper threshold level $I_1$ corresponding to the primary closing current set point PC is output from the microprocessor 20 for the duration of the determined primary closing time PCT.

The upper and lower threshold levels $I_1$, $I_2$ are such that the mean current produced meets the primary opening current set point PO and primary closing current set point PC. It is to be appreciated that it is more convenient to refer to the mean current since it is this current, and the time that it is applied for, which determines the amount of charge applied or removed. The upper threshold levels $I_1$, and the lower threshold levels $I_2$ produced by the potential divider, determine the values which the current is caused to vary between.

Figure 4:
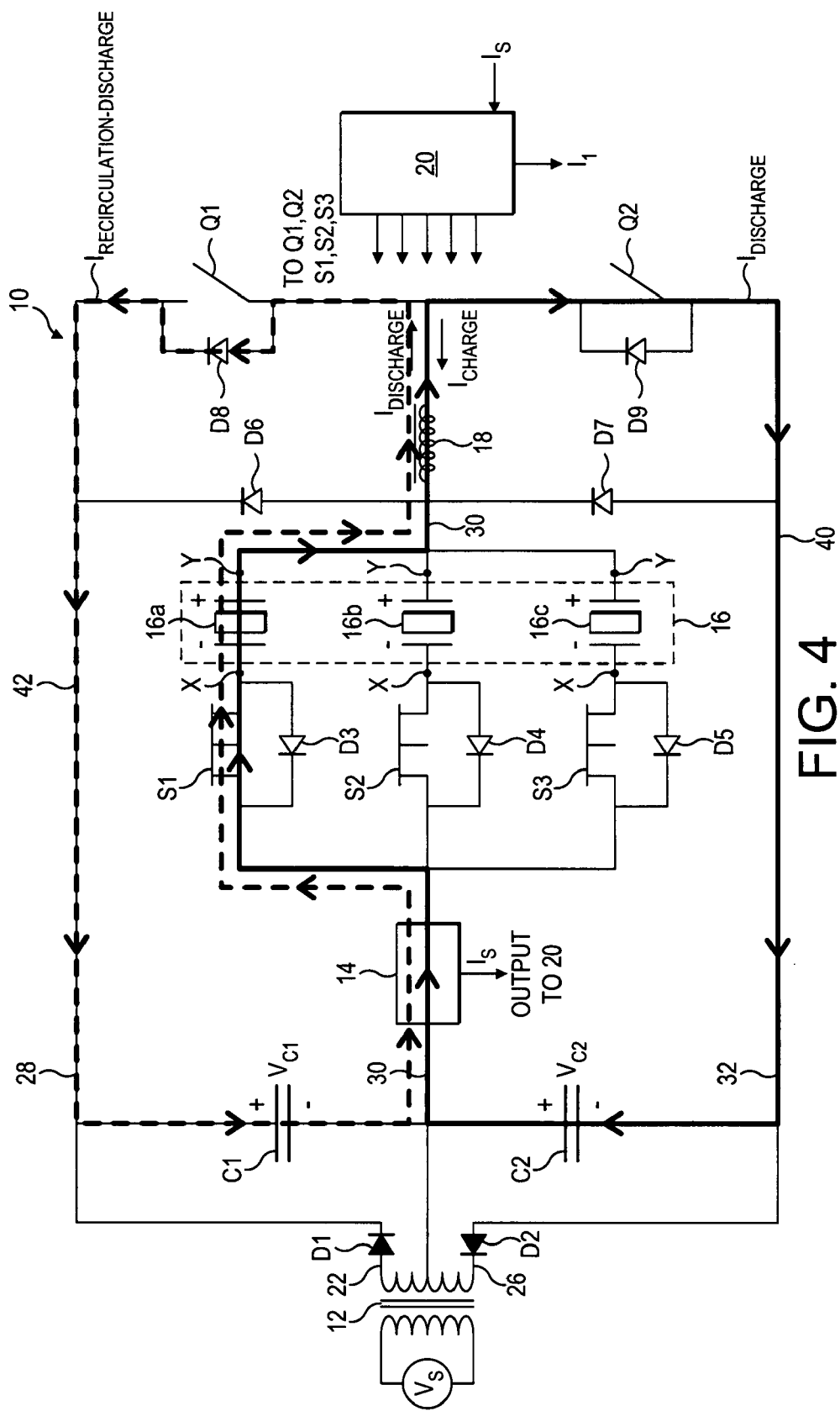
FIG. 4 shows the current paths around the circuit in a discharge phase.

To inject with a particular injector 16a, 16b, 16c the select switch S1, S2, S3 for that injector is activated (closed), upon an appropriate signal from the microprocessor 20. For example, referring to FIG. 4, if it is required to inject with the first injector 16a, the select switch S1 is closed. The other two injector select switches S2, S3 of the bank remain de-activated at this time as the second and third injectors 16b, 16c with which they are associated are not required to inject.

In addition, the discharge enable signal 34 goes from a logic low to a logic high. The current sensing and control means 14 initially outputs a logic high signal, and this and the high discharge enable signal causes the discharge switch Q2 to close. Current is allowed to flow from the 100 V supply across capacitor C2, through the current sensing and control means 14, through the selected switch (S1 in this example), and into the corresponding negative side of the selected injector (16a in this example). The current $I_{DISCHARGE}$ flows from the injector load for injector 16a, through the inductor 18, through the closed switch Q2 and back to the negative terminal of capacitor C2. As the select switches S2 and S3 remain open, and due to the direction of their associated diodes, D4 and D5 respectively, substantially no current is able to flow through the second and third injectors 16b, 16c. The discharge current $I_{DISCHARGE}$ is shown as the solid line 40 in FIG. 4.

The current sensing and control means 14 monitors the current flow through the middle current path 30 as it builds up and, as soon as the upper threshold level $I_1$ is reached, the output from the current sensing and control means 14 switches from a logic high to a logic low causing de-activation (opening) of the discharge switch Q2. At this point, the energy that is built up in the inductor 18 recirculates through the diode D8 associated with the charge (open) switch Q1. As a consequence, the direction of current flow through the inductor 18 and the selected one of the injectors 16a does not change. This is a "recirculation phase" of the discharge phase 6 of operation of the drive circuit 10. The recirculation discharge current is shown as the dashed line 42 in FIG. 4.

During the recirculation phase, current flows from the negative side of the 200 volt power supply across capacitor C1, through the current sensing and control means 14, through the selected switch S1, through the selected injector 16a, through the inductor 18, and finally through the diode D8 and into the positive side of capacitor C1. Thus, energy from the inductor 18 and the selected one of the injectors 16a is transferred to the capacitor C1 during the recirculation phase for energy storage purposes. The current sensing and control means 14 monitors the recirculation current, so that when the recirculation current has fallen below the lower threshold level (i.e. the recirculation current threshold) $I_2$, the current sensing and control means 14 generates a signal to reactivate the discharge switch Q2 to continue the discharge operation.

The varying current is driven through the stack 2 until the primary opening time POT expires. In this discharge phase 6, the capacitor C2 provides energy, while capacitor C1 receives energy for storage. At the end of the primary opening time POT, the discharge switch Q2 and the select switch S1 of the injector 16a are deactivated.

It is desirable that the injector select switch S1, S2, S3 is deactivated before the discharge switch Q2 because the rate at which the current decays depends solely on the inductor 18: without deselecting the injector select switch S1, S2, S3 first, the current would decay slowly resulting in more charge than intended being removed from the stack 2. By deselecting the injector select switch first, the current is forced to zero much quicker, and the additional charge removed is minimal. Where the discharge switch Q2 is deactivated substantially simultaneously or soon after the injector select switch, the diode D7 provides a recirculation path for residual energy in the inductor 18 at the end of the discharge phase 6 in order to recirculate to the first energy storage capacitor C1 via the diode D8 associated with the charge switch Q1.

At the appropriate time, the stack 2 of the selected injector 16a, 16b, 16c will be charged in order to close the injector to cease fuel delivery. As stated above, the timing of when the injectors open and close is determined by the ECM and is not important to the understanding of the present invention.

In order to charge (close) the injector 16a, the charge enable signal 36 switches from logic low to logic high causing the charge switch Q1 to close. The select switch S1 of the first injector 16a, which has previously been injecting, is activated to close again and a varying current flows through the injector 16a during the charge phase 8. The second and third switches S2, S3 remain open. In such circumstances, the majority of the charge current $I_{CHARGE}$ during the charge phase 8 will flow through the previously discharged injector (i.e. the selected injector 16a in the example described), as this injector is at a much lower voltage/charge level at the start of the charging phase 8 than the unselected injectors 16b, 16c. The remaining injectors 16b, 16c that were not previously discharged will receive current if the corresponding charge levels on them have dropped below a charge threshold $Q_{CHARGE}$. There is inevitably a small amount of current leakage through the diodes D4, D5 of the unselected injectors 16b, 16c during the discharging phase 6 of the selected injector 16a, so that the charge level on each of these injectors 16b, 16c will be slightly less than the nominal charge level ($Q_{CHARGE}$) in practice. The solid line 50 in FIG. 5 shows the direction and path of the charging current $I_{CHARGE}$.

The current sensing and control means 14 monitors the current build-up and, as soon as the upper threshold level $I_1$ (corresponding to the primary closing current set point PC) is reached, the current sensing and control means 14 generates a control signal to open the first switch Q1. At this point, the current that has built up in the inductor 18 recirculates through the diode D9 associated with the discharge (open) switch Q2. This is a recirculation phase of the charge phase of operation of the drive circuit 10. The direction of current flow through the inductor 18 and the injectors 16a, 16b, 16c does not change during the recirculation phase.

It is worth noting that the current flows in a different direction during the charge phase 8 than in the discharge phase 6, and so has been drawn as having a negative value in FIG. 2. However, in terms of the actual set points and upper and lower threshold levels $I_1$, $I_2$, the direction (sign/polarity) of the current flow is not important. In addition, the current thresholds levels $I_1$ and $I_2$ of the discharging phase 6 need not be the same values as those of the charging phase 8, i.e. the mean charging current need not equal the mean discharging current, and the stack 2 may charge and discharge at different rates.

Figure 5:
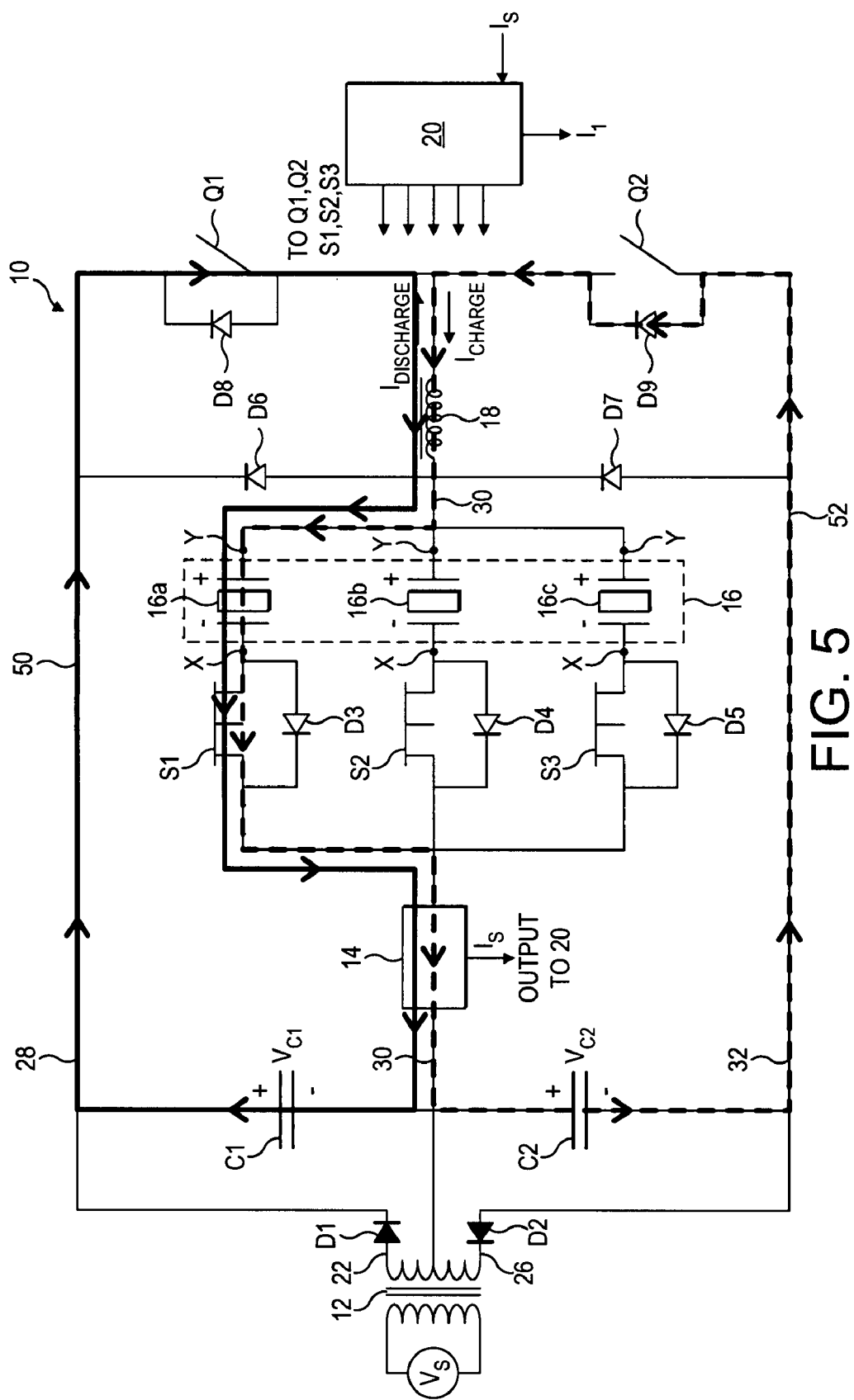
FIG. 5 shows the current paths around the circuit in a charge phase.

As shown by the dashed line 52 in FIG. 5, during the recirculation phase, current flows from the negative side of the 100 Volt power supply across the capacitor C2, through the diode D9, through the inductor 18 and the injectors 16a, 16b, 16c, through the diodes D3, D4, D5, and the current sensing and control means 14 and into the positive side of energy storage capacitor C2. During this recirculation phase, energy from the inductor 18 and the piezoelectric injectors 16a, 16b, 16c is transferred to the energy storage capacitor C2. The current sensing and control means 14 monitors the recirculation current and, when the recirculation current has fallen below the lower (recirculation current) threshold value $I_2$, the current sensing and control means 14 reactivates (closes) the first switch Q1 to continue the charging process.

The varying current is driven through the stack 2 until the primary closing time PCT determined earlier expires. In this charging phase 8, the energy storage capacitor C1 provides energy and the energy storage capacitor C2 receives energy for storage. At the end of the primary closing time PCT (charge time), the charge switch Q1 and the select switch S1 of the injector 16a are deactivated.

Generally, it is not critical at the end of the charge phase 8, as it is at the end of the discharge phase 6, whether the injector select switch S1, S2, S3 or charge switch Q1 is deselected first. This is because at the end of the primary closing time PCT or charge time, the stack 2 is effectively charged to its initial top rail voltage V0 and so, as a result, there can be only a minimal amount of current flowing (it is not possible to charge the stack 2 indefinitely due to its capacitive nature). This means that it is not possible to apply more charge than intended and ensures that the stack 2 is always recharged to a known state prior to the subsequent discharge. In essence, this is to ensure consistent fuel delivery.

There is a closed loop system, which does not form part of the present invention, that operates to keep the voltage across the stack between injections at the top rail voltage V0. Therefore, at the start of subsequent discharge phases the stack is always at a known reference level.

A person skilled in the art will comprehend that the stack 2 is not always fully charged during the charging phase 8, for example, in a merging pulse mode as described in co-pending European patent application no. 06252022.6. If it is desirable that the stack 2 is not fully charged then it becomes important that the injector select switch S1, S2, S3 is turned off before the charge switch Q1 for the aforementioned reason.

It is to be appreciated that there are other ways in which the injectors 16a, 16b, 16c may be charged. For example, it is possible to charge the injectors 16a, 16b, 16c without activating their injector select switches S1, S2, S3 since the diodes D3, D4 and D5 across the injector select switches S1, S2, S3 ensure that current can flow in that direction in order to charge the stacks 2 to full charge when only the charge switch Q1 is activated (closed).

It is an advantage of controlling an injector using the charge control method that control of the actuator 1 over its lifetime is improved because the charge control method is not susceptible to capacitance changes in the life of the stack 2 as in the prior art systems described above. It is a further advantage that the charge control method offers improved control with variations in operating conditions, such as part-to-part variations, since stroke/charge variations between parts are generally smaller than stroke/voltage variations between parts. A further advantage is that there is a linear variation in stack displacement with temperature for a constant change in charge. However, in known voltage control methods the variation in stack displacement with temperature for a constant change in voltage is non-linear. The linear displacement associated with the charge control method can be accounted for easily, unlike the non-linear variation associated with the voltage control method.

A preferred embodiment of this invention seeks to minimise the stress experienced by the actuator 1 when trying to achieve desired lift.

The piezoelectric stack 2 can be considered as an underdamped system where the response to a drive signal is a displacement with overshoot which is followed by oscillations of reducing magnitude over time. The displacement overshoot and subsequent oscillations can be observed on the stack voltage. At the end of the discharge phase 6, the stack 2, because of its momentum, continues to be displaced yet the displacement does not correspond to a change in charge, i.e. the charge on the stack remains constant while the stack continues to shorten. The compression within the stack is therefore increased and, due to its piezoelectric nature, this causes an increase in voltage across the stack. The rise in voltage across the stack is in the opposite direction to the fall in voltage during the discharge phase 6, i.e. the increased compression in the stack causes the stack to lengthen. Again, due to its momentum, the stack continues to lengthen after the steady state voltage is reached, placing the stack under tension. This in turn causes the voltage across the stack to decrease again and the stack is displaced in the opposite direction. The stack displacement oscillates in this manner until settling down to a final value. The displacement overshoot and subsequent oscillations correspond to the stack 2 experiencing more stress than necessary to achieve the target displacement.

Figure 6:
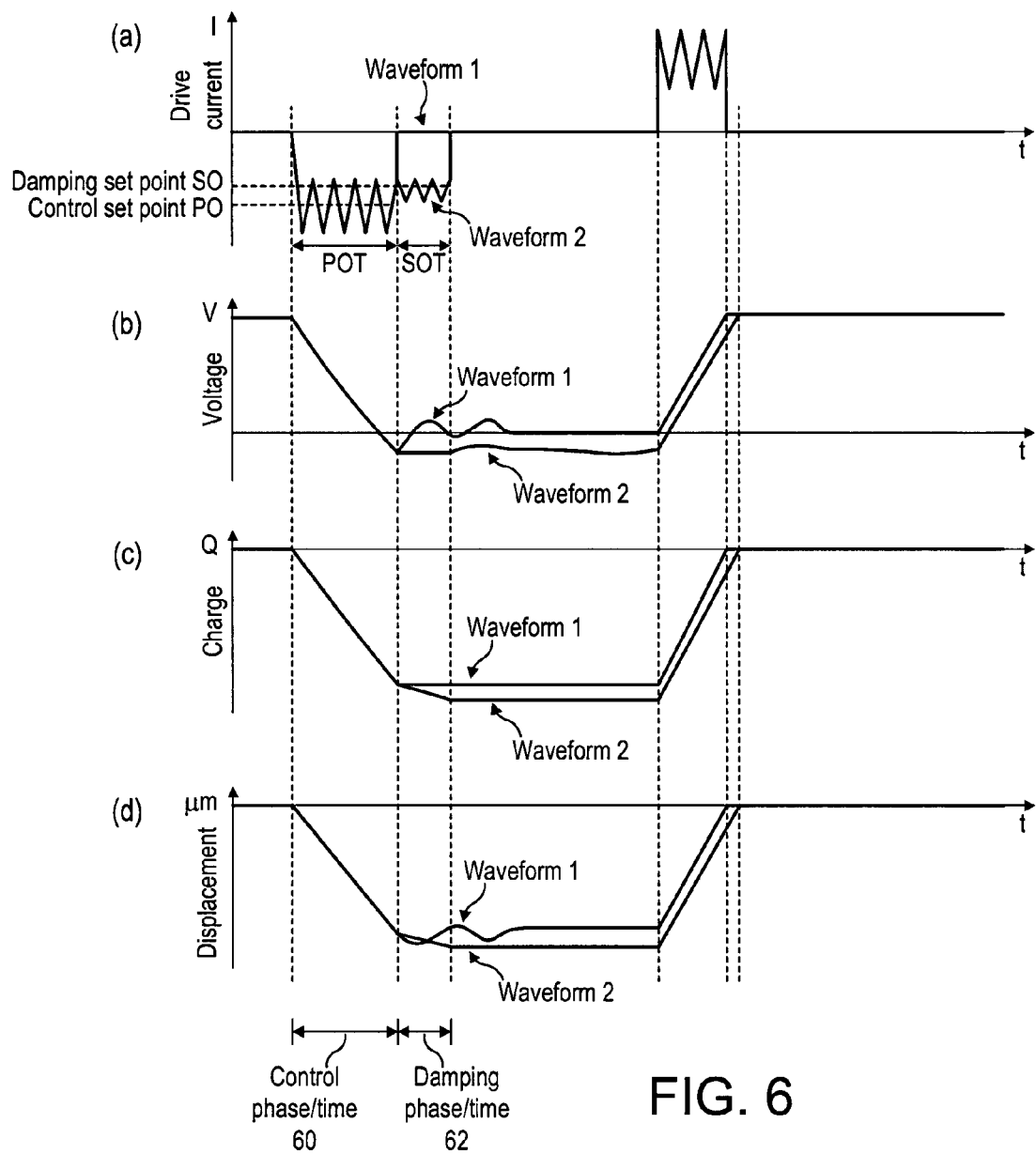
FIG. 6 shows waveforms for (a) drive current, (b) voltage, (c) charge and (d) displacement versus time for an injection event.

FIG. 6 shows Waveforms 1 and 2 for (a) drive current, (b) voltage, (c) charge and (d) stack displacement versus time for an injection event. The overshoot and oscillations can clearly been seen in the voltage and displacement graphs of Waveform 1.

In order to counteract (damp) the displacement overshoot and associated oscillations, the rate of charge (corresponding to the mean current level or set-point) is reduced towards the end of the discharging (opening) phase 6. This is achieved by the implementation of one or more additional electrical discharge phases. In the example in FIG. 6, there are two discharge phases corresponding to a primary opening time POT and a secondary opening time SOT. Each discharge phase has an associated current set point, in this case a primary opening current set point PO, referred to as a control set point, and a secondary opening current set point SO, referred to as a damping set point.

Additional electrical discharge/charge phases (damping phases) can also be added at the beginning of the injector opening (or closing) in order to provide a reduced (or increased) initial rate of displacement. An advantage of including additional damping phases at the start of the discharge or charge phase is that they help to reduce the acceleration of the stack 2. The discharge/charge rate or mean current level can be considered to be the velocity with which the stack 2 charges/discharges i.e. lengthens or shortens. Additional damping phases at the beginning and end of the charge/discharge phase 8, 6, that are smaller in magnitude than the main charge/discharge phase, encourage lower acceleration/deceleration of the lengthening/shortening of the stack 2. This reduces the stress placed on the stack 2.

In theory there is no limit to the number of different charge levels. In fact, a preferential way to drive a piezoelectrically actuated stack 2 is with a sine wave, and so a number of different charge levels could be used to simulate a sine wave for optimum performance.

Significant improvements can also be seen when using just two charge levels or set points (the control set point and the damping set point) as shown in FIG. 6. The overshoot present in the voltage graph for Waveform 1 is not present in Waveform 2, and the displacement graph for Waveform 2 is much smoother than for Waveform 1.

In the example in FIG. 6, the control set point is applied during a control phase 60 (since the majority of opening/closing control occurs during the primary phase), and the damping set point is applied during a damping phase 62. Where there are more than two charge levels/set points, the first charge phase is referred to as the control phase, and the subsequent charge phases are referred to as a first damping phase, second damping phase etc for the required number of charge phases.

The damping set point (the secondary opening current set point SO) is derived in much the same way as the control set point (primary opening current set point PO) detailed above; for example look-up tables produce additional values for the secondary opening current set point SO and an associated secondary opening time SOT depending on stack pressure and stack temperature.

Typically, the secondary opening current set point SO and secondary opening time SOT are effectively independent of the primary opening current set point PO and the primary opening time POT by virtue of the fact that their values are stored in look-up tables. A person skilled in the art will comprehend how to set the secondary opening current set point SO and the secondary opening time SOT.

As described above, the microprocessor 20 outputs the primary opening upper threshold level $I_1$ for the primary opening time POT. At the expiry of the primary opening time POT, the microprocessor 20 outputs the secondary opening upper threshold level $I_1$ for the duration of the secondary opening time SOT. The microprocessor 20 will continue to output appropriate upper threshold levels for the required number of discharge levels to achieve the desired amount of discharge. The number of discharge (or charge) levels required is determined by the ECM control strategy.

The method described above operates in the condition where the injection on time TON is greater than the combined durations of the control phase 60 and any additional damping phases 62, and a dwell time $t_{dwell}$, which is the minimum (waiting) time for the hardware to switch from one state to another.

Figure 7:
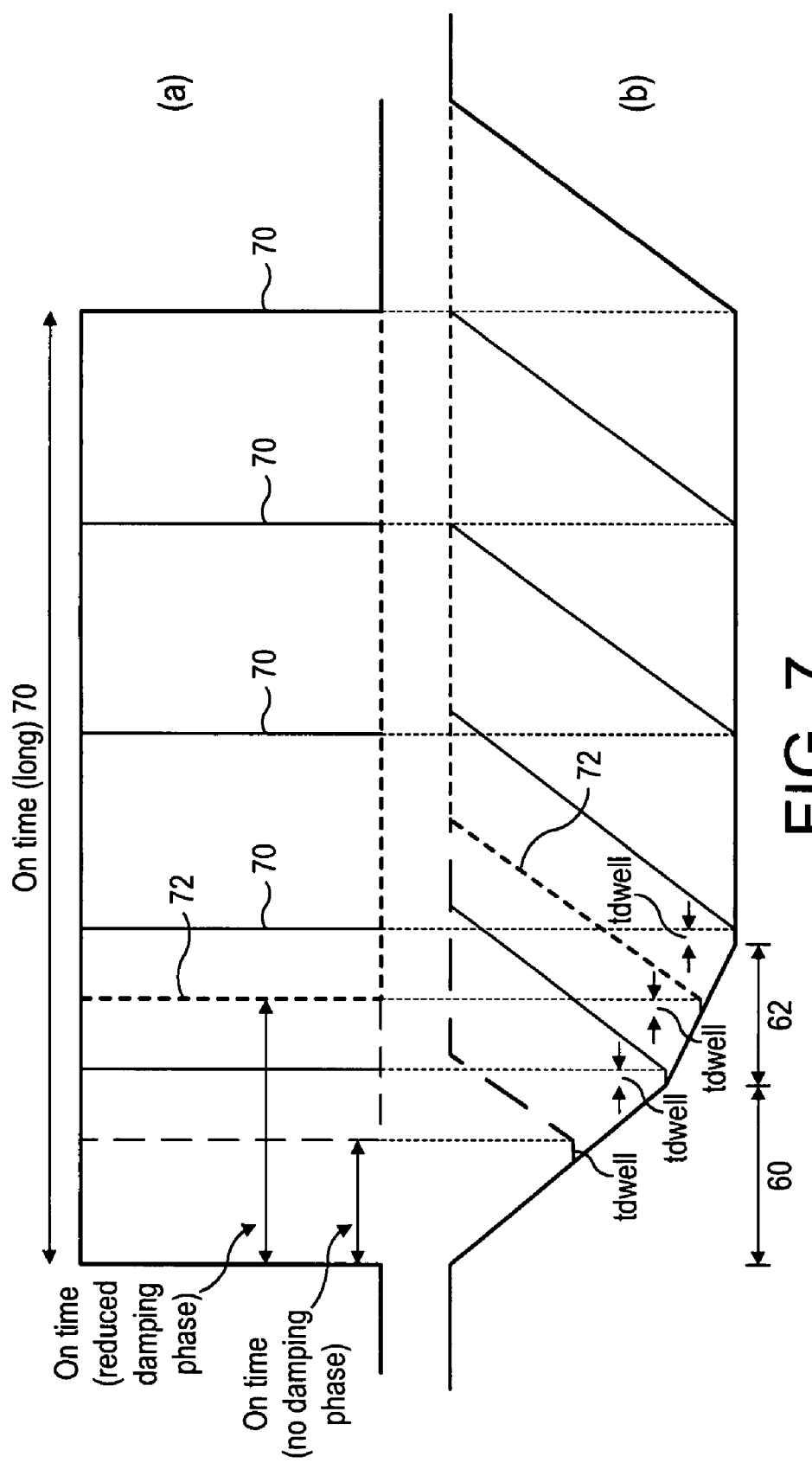
FIG. 7 shows (a) different lengths of "injector on time", and (b) corresponding charge graphs wherein the present invention operates with two charge levels.

The injection on time TON, as described above, is determined from the fuel demand and is also a function of the fuel rail pressure. As the fuel demand is continuously variable across the engine operating range, so too is the injection on time TON, as shown in FIG. 7. As a result, it is possible that for small fuel deliveries it is likely that the injection on time TON will be less than the time required to complete the control phase 60 and the damping phase(s) 62.

As a result, the control phase 60 takes priority over any damping phases 62. As the injection pulse on time TON reduces, the length of the damping phase(s) 62 will be minimised before any reduction occurs in the control phase 60. Each damping phase 62 is assigned a priority, and the damping phases are minimised such that the lower priority phases will be reduced before the higher priority phases. The damping phase 62 immediately after the control phase 60 is accorded the highest priority.

FIG. 7 shows a number of injection pulse on times TON of different durations and their associated charge waveforms. For the longer duration pulses 70 there is sufficient time for both the control phase 60 and the damping phase 62. However, as the duration of the on time TON reduces, there is a requirement to reduce the damping phase. The dotted line 72 in FIG. 7 shows an example where the on time TON is such that the damping time needs to be reduced.

FIG. 7 also shows the requirement of a dwell time $t_{dwell}$ between finishing the discharge phase 6 and commencing the subsequent charge phase 8 since there is a finite time for the switches to switch from one state to another Where the damping time 62 must be reduced, it is set to equal the on time TON minus the control time POT and minus the dwell time $t_{dwell}$, i.e. the control time POT is not adjusted and the damping time is set to equal the remaining on time TON after the control time POT and the dwell time $t_{dwell}$ have expired.

Where the on time TON is less than the desired control time (the primary opening time POT), the control time is set to equal the on time TON minus the dwell time $t_{dwell}$, and no damping time exists.

Figure 8:
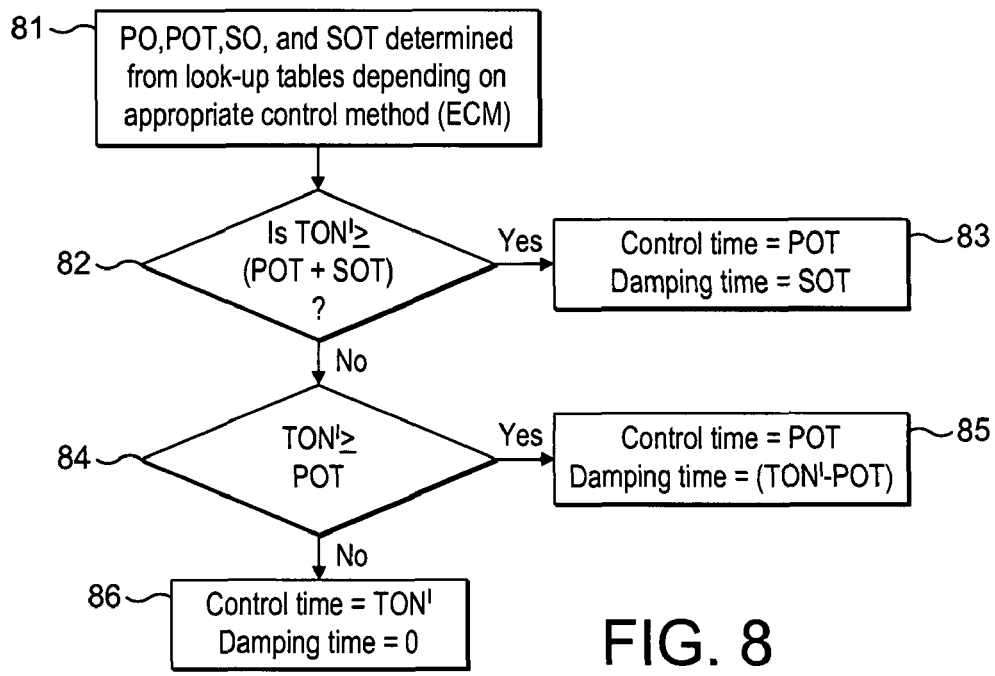
FIG. 8 shows a flowchart of steps in determining a control and damping time from an available injector on time.

FIG. 8 shows a flow chart of the control steps in determining the timing of the control and damping phases. In a first step 81, the current levels for the primary opening current set point PO and secondary opening current set point SO are determined, together with their associated primary opening time (control time) POT, and secondary opening time (damping time) SOT.

In a second step 82, the sum of the primary opening time POT and the secondary opening time SOT is compared with the on time TON minus the dwell time $t_{dwell}$ (referred to as the available on time TON' to show that the dwell time has been taken into account). If TON' is greater or equal to the sum of the primary and secondary opening times, control passes to a third step 83 which sets the control time 60 to equal the primary opening time POT, and the damping time 62 to equal the secondary opening time SOT, as determined by the look-up tables.

If TON' is not greater or equal to the sum of the primary and secondary opening times, control passes to a fourth step 84 where TON' is compared with just the primary opening time POT. If TON' is greater or equal to the primary opening time POT, control passes to a fifth step 85 which sets the control time 60 to equal the primary opening time POT, and sets the damping time 62 to equal the on time TON' minus the primary opening time POT. In other words, the damping time 62 is set to equal the amount of time remaining from the on time TON' after the control time/primary opening time POT, and the dwell time $t_{dwell}$, have expired.

If TON' is not greater than the primary opening time POT, control passes to a sixth step 86 which sets the control time 60 to equal all of the available on time TON', and the damping time 62 is set to zero since there is not enough time to include a damping phase.

In a preferential embodiment, the present invention 'blends' the primary opening current set point PO (control rate) with the secondary opening current set point SO (damping rate) when the damping time available is short, as described below. When control is passed to the fifth step 85 shown in FIG. 8, the damping rate is adjusted according to the following equation:

adjusted damping rate 92=secondary opening current set point (SO)+(Δrate *scale), where:

Δrate=primary opening current set point (PO)−secondary opening current set point (SO), and scale=f(damping time available (TON−POT)/secondary opening time (SOT))

For example, where there is a very short damping time 62 available the damping rate is adjusted to a value approaching the control rate PO, and where the damping time 62 is sufficiently long the damping rate is adjusted to a value approaching the damping rate SO originally demanded. At a particular length of damping time the adjusted damping rate 92 equals the damping rate SO originally demanded. From the above equation this occurs when the scale, which is a function of the available damping time divided by the secondary opening time, equals zero.

Figure 9:
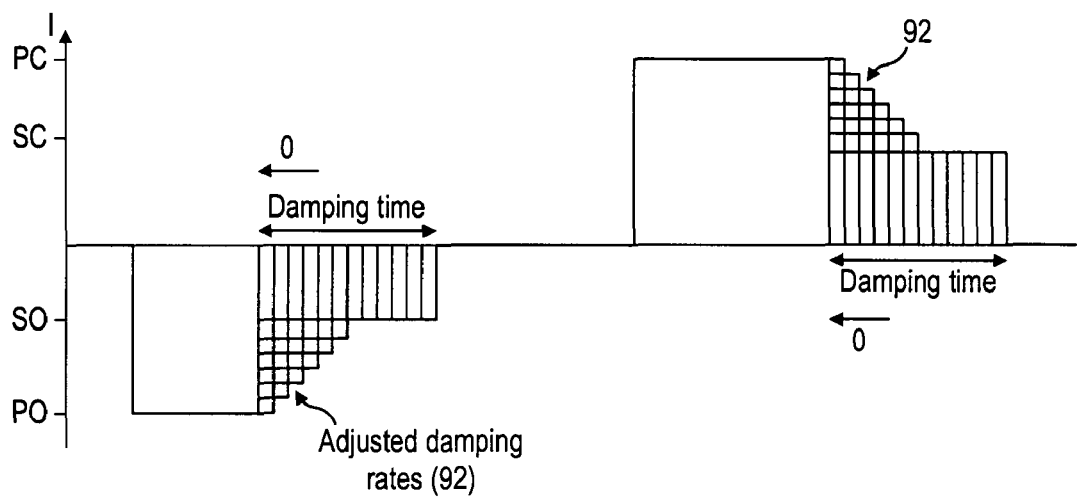
FIG. 9 shows a number of adjusted damping rates as the damping time tends towards zero.

FIG. 9 shows examples of adjusted damping rates 92 as the damping time 62 reduces to zero. The current set points PO, SO, PC, and SC have been used to illustrate the adjusted damping rates 92 in FIG. 9. However, the actual current varies about these set points as described above. When the damping rate 92 is adjusted the microprocessor 20 outputs an adjusted upper threshold $I_1$, corresponding to the new adjusted damping rate 92.

A further preferred embodiment of the present invention seeks to eliminate variations in charge delivery when multiple charge levels PO, SO, PC, SC are employed and to improve accuracy in charge control during current level changes over a large number of operating conditions. Different operating conditions may include different drive circuits having slightly different inductances caused by part-to-part variations, or when the electrical load on the drive circuit varies due to different conditions i.e. cold/hot injectors.

Figure 10A:
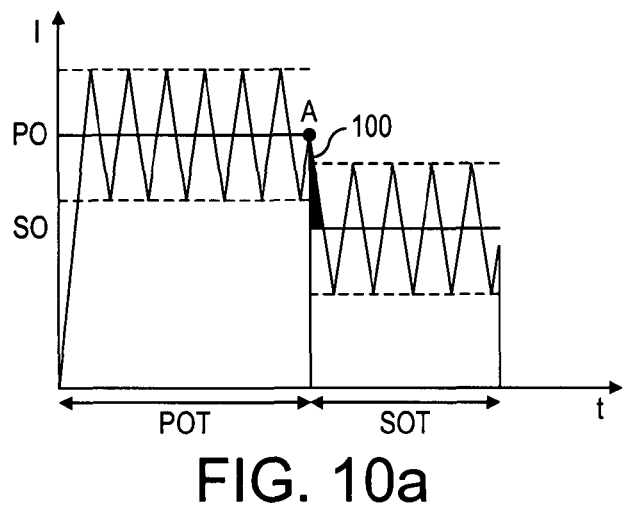
FIG. 10a shows a current waveform with two current set points, and an associated amount of additional charge.
Figure 10B:
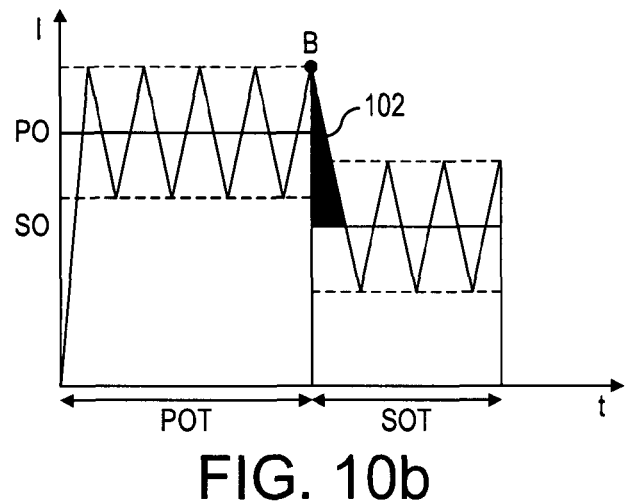
FIG. 10b shows a current waveform similar to that shown in FIG. 10a, wherein the amount of additional charge is larger than that shown in FIG. 10a, and FIG. 10c shows a current waveform according to a preferred embodiment of the invention, wherein the amount of additional charge is reduced.

As a result of these different operating conditions, there may be a variation in charge delivery, for a constant primary opening time POT, when using multiple current levels. This is highlighted in FIGS. 10*a* and 10*b* depending on the value the varying current when the current levels changes. As shown in FIG. 10*a*, at the end of the primary opening time POT the current set point level changes from the primary opening current set point PO to the secondary opening current set point SO. The varying current at point A is somewhat higher than the secondary opening current set point SO. This corresponds to a first additional amount of charge 100 being transferred to/removed from the stack 2. In the case shown in FIG. 10*b*, the value of the varying current at point B is much higher than the secondary opening current set point SO and a second, much larger, additional amount of charge 102 is transferred/ removed from the stack 2. As a result, there is an inconsistency in the charge control, which may result in inconsistent fuelling.

Figure 10C:
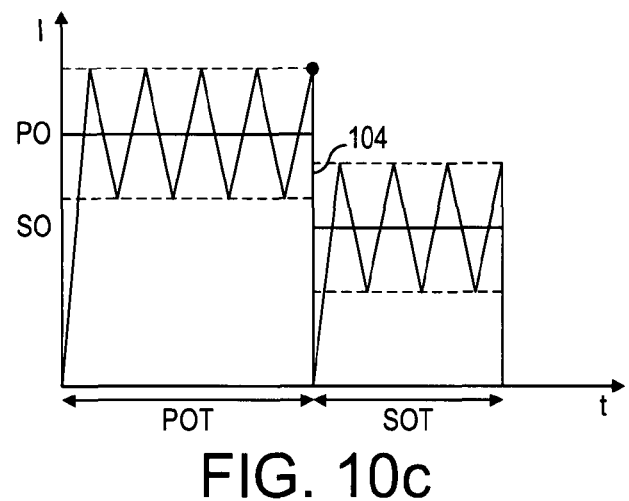

In order to counter the aforementioned problem the injector select switch S1, S2, S3 is temporarily switched off at the end of the primary opening time POT. Typically, the injector select switch S1, S2, S3 is deactivated for approximately 20 μs. As shown in FIG. 10c, the current is forced to zero when the injector select switch is deactivated. When the injector select switch is re-activated the current increases until it reaches the upper threshold and operation continues as described above. As a result the additional charge 104 applied/removed from the stack 2 is minimal.

It is to be appreciated that although the present invention is described above in relation to de-energise-to-inject injectors, the present invention can also be implemented using energise-to-inject injectors.

The invention claimed is:

1. A method for controlling the displacement of a stack of a piezoelectric actuator for use in a fuel injector in a fuel system, the method comprising;
    determining an operating parameter of the fuel system,
    determining a desired amount of charge (ΔQ) to be added or removed from the stack,
    selecting a drive current level (PO, SO) and a drive time ($t_{open}$, $t_{close}$) in accordance with the desired amount of charge (ΔQ) and the operating parameter, and
    driving the drive current through the stack for the drive time ($t_{open}$, $t_{close}$) in order to add or remove the desired amount of charge (ΔQ),
    further including removing charge from the stack during a primary opening phase/time (6, POT) at a rate determined by a primary opening current level (PO), and adding charge to the stack during a primary closing phase/time (8, PCT) at a rate determined by a primary closing current level (PC),
    further comprising one or more additional damping phases before and/or after the primary opening phase/time (POT) and/or further comprising one or more additional damping phases before and/or after the primary closing phase/time (PCT),
    further comprising determining a current level and duration for the or each additional damping phase, and assigning a priority value to the or each additional damping phase.

2. The method as claimed in claim 1, wherein the operating parameter is at least one of stack temperature and rail pressure.

3. The method as claimed in claim 1, including adding charge to the stack during a primary opening phase/time (6, POT) at a rate determined by a primary opening current level (PO), and removing charge from the stack during a primary closing phase/time (8, PCT) at a rate determined by a primary closing current level (PC).

4. The method as claimed in claim 1, further comprising:
    determining an available injector on time (TON') depending on at least one operating variable of the fuel system and a hardware switching time ($t_{dwell}$),
    comparing the sum of (i) the primary opening time (POT) and (ii) the duration of each of the additional damping phases (62) with the available injector on time (TON'), and
    if the available injector on time (TON') is not greater than the sum of (i) and (ii), reducing the duration of one or more of the additional damping phases, starting with the additional damping phase with the lowest priority value.

5. The method as claimed in claim 1, including adjusting the damping phase current level in accordance with an adjustment factor as the remaining damping duration tends to zero, in order to successively increase the damping phase current level towards the primary opening current level (PO).

6. The method as claimed in claim 5, wherein the adjustment factor is dependent on at least one of (i) the difference between the primary opening current level (PO) and the damping phase current level, and (ii) a function of the remaining damping duration and a desired damping duration.

7. A method for controlling the displacement of a stack of a piezoelectric actuator for use in a fuel injector in a fuel system, the method comprising;
    determining an operating parameter of the fuel system,
    determining a desired amount of charge (ΔQ) to be added or removed from the stack,
    selecting a drive current level (PO, SO) and a drive time ($t_{open}$, $t_{close}$) in accordance with the desired amount of charge (ΔQ) and the operating parameter, and
    driving the drive current through the stack for the drive time ($t_{open}$, $t_{close}$) in order to add or remove the desired amount of charge (ΔQ),
    further including removing charge from the stack during a primary opening phase/time (6, POT) at a rate determined by a primary opening current level (PO), and adding charge to the stack during a primary closing phase/time (8, PCT) at a rate determined by a primary closing current level (PC),
    further comprising one or more additional damping phases before and/or after the primary opening phase/time (POT) and/or further comprising one or more additional damping phases before and/or after the primary closing phase/time (PCT), further comprising:
    activating an injector select switch to enable the injector to open during an opening phase comprising the primary opening phase (POT) and at least one damping phase, and
    charging the stack so as to open the injector wherein, at the transition between the primary opening phase (POT) and a first additional damping phase and/or between adjacent additional damping phases, the injector select switch is temporarily deactivated.

8. A method for controlling the displacement of a stack of a piezoelectric actuator for use in a fuel injector in a fuel system, the method comprising;
    determining an operating parameter of the fuel system,
    determining a desired amount of charge (ΔQ) to be added or removed from the stack,
    selecting a drive current level (PO, SO) and a drive time ($t_{open}$, $t_{close}$) in accordance with the desired amount of charge (ΔQ) and the operating parameter, and
    driving the drive current through the stack for the drive time ($t_{open}$, $t_{close}$) in order to add or remove the desired amount of charge (ΔQ),
    further including removing charge from the stack during a primary opening phase/time (6, POT) at a rate determined by a primary opening current level (PO), and adding charge to the stack during a primary closing phase/time (8, PCT) at a rate determined by a primary closing current level (PC),
    further comprising one or more additional damping phases before and/or after the primary opening phase/time (POT) and/or further comprising one or more additional damping phases before and/or after the primary closing phase/time (PCT), further comprising:

activating an injector select switch to enable the injector to open during an opening phase comprising the primary opening phase (POT) and at least one of the additional damping phases, and discharging the stack so as to open the injector wherein, at the transition between the primary opening phase (POT) and a first additional damping phase and/or between adjacent additional damping phases, the injector select switch is temporarily deactivated.

9. A method for controlling the displacement of a stack of a piezoelectric actuator for use in a fuel injector in a fuel system, the method comprising;

determining an operating parameter of the fuel system, determining a desired amount of charge ($\Delta Q$) to be added or removed from the stack, selecting a drive current level (PO, SO) and a drive time ($t_{open}$, $t_{close}$) in accordance with the desired amount of charge ($\Delta Q$) and the operating parameter, and driving the drive current through the stack for the drive time ($t_{open}$, $t_{close}$) in order to add or remove the desired amount of charge ($\Delta Q$), further including removing charge from the stack during a primary opening phase/time (6, POT) at a rate determined by a primary opening current level (PO), and adding charge to the stack during a primary closing phase/time (8, PCT) at a rate determined by a primary closing current level (PC), further comprising one or more additional damping phases before and/or after the primary opening phase/time (POT) and/or further comprising one or more additional damping phases before and/or after the primary closing phase/time (PCT), further comprising:

activating an injector select switch to enable the injector to close during a closing phase comprising the primary closing phase (PCT) and at least one of the additional damping phases, and charging the stack so as to close the injector wherein, at the transition between the primary closing phase (PCT) and a first additional damping phase and/or between adjacent additional damping phases, the injector select switch is temporarily deactivated.

10. A method for controlling the displacement of a stack of a piezoelectric actuator for use in a fuel injector in a fuel system, the method comprising;

determining an operating parameter of the fuel system, determining a desired amount of charge ($\Delta Q$) to be added or removed from the stack, selecting a drive current level (PO, SO) and a drive time ($t_{open}$, $t_{close}$) in accordance with the desired amount of charge ($\Delta Q$) and the operating parameter, and driving the drive current through the stack for the drive time ($t_{open}$, $t_{close}$) in order to add or remove the desired amount of charge ($\Delta Q$), further including removing charge from the stack during a primary opening phase/time (6, POT) at a rate determined by a primary opening current level (PO), and adding charge to the stack during a primary closing phase/time (8, PCT) at a rate determined by a primary closing current level (PC), further comprising one or more additional damping phases before and/or after the primary opening phase/time (POT) and/or further comprising one or more additional damping phases before and/or after the primary closing phase/time (PCT), further comprising:

activating an injector select switch to enable the injector to close during a closing phase comprising the primary closing phase (PCT) and at least one of the additional damping phases, and discharging the stack so as to close the injector wherein, at the transition between the primary closing phase (PCT) and a first additional damping phase and/or between adjacent additional damping phases, the injector select switch is temporarily deactivated.

* * * * *